US012811223B2

(12) United States Patent
Sato et al.

(10) Patent No.: US 12,811,223 B2
(45) Date of Patent: Nov. 24, 2026

(54) LID BODY AND SEALED BATTERY

(71) Applicants: Prime Planet Energy & Solutions, Inc., Tokyo (JP); TOYOTA JIDOSHA KABUSHIKI KAISHA, Aichi-ken (JP)

(72) Inventors: Yuki Sato, Toyota (JP); Yozo Uchida, Toyota (JP); Hideki Asadachi, Toyota (JP); Tsuyoshi Ehara, Toyota (JP); Syoichi Tsuchiya, Toyota (JP); Masataka Asai, Toyota (JP); Tsuyoshi Asano, Toyota (JP); Masahiro Uchimura, Toyota (JP); Nozomi Tateyama, Okazaki (JP)

(73) Assignees: PRIME PLANET ENERGY & SOLUTIONS, INC., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 827 days.

(21) Appl. No.: 17/534,302

(22) Filed: Nov. 23, 2021

(65) Prior Publication Data

US 2022/0173466 A1 Jun. 2, 2022

(30) Foreign Application Priority Data

Nov. 30, 2020 (JP) ................................ 2020-198150

(51) Int. Cl.
*H01M 50/167* (2021.01)
*H01M 50/15* (2021.01)

(52) U.S. Cl.
CPC ......... *H01M 50/167* (2021.01); *H01M 50/15* (2021.01)

(58) Field of Classification Search
CPC ............................ H01M 50/15; H01M 50/167
See application file for complete search history.

(56) References Cited

U.S. PATENT DOCUMENTS

2013/0260212 A1* 10/2013 Kohno ................ H01M 50/538 429/158
2013/0330599 A1 12/2013 Kroll et al.
2013/0330604 A1 12/2013 Kroll et al.
(Continued)

FOREIGN PATENT DOCUMENTS

CN 103503221 A 1/2014
CN 105144424 A 12/2015
(Continued)

OTHER PUBLICATIONS

JP-2006221909-A English machine translation (Year: 2024).*
JP2016105374A English machine translation (Year: 2026).*

*Primary Examiner* — Armindo Carvalho, Jr.
(74) *Attorney, Agent, or Firm* — HAUPTMAN HAM, LLP

(57) ABSTRACT

A lid body including: a terminal member of at least one electrode; a sealing plate having a mounting hole for attaching the terminal member; and a sealing material containing an inorganic filler. The terminal member is inserted into the mounting hole and is attached to the sealing plate in a state where the sealing material is joined to a peripheral edge portion of the mounting hole. In a microscope observation of a cross section of the sealing material, an average aspect ratio of the inorganic filler is 2 or higher, and with an average orientation angle of the inorganic filler is 30 degrees or smaller, in at least the sealing material formed on an outer surface of the sealing plate.

14 Claims, 3 Drawing Sheets

(56) References Cited

U.S. PATENT DOCUMENTS

| | | | | |
|---|---|---|---|---|
| 2014/0193691 | A1 | 7/2014 | Ueki et al. | |
| 2016/0099441 | A1* | 4/2016 | Harayama | H01M 50/103<br>429/158 |
| 2016/0336550 | A1* | 11/2016 | Kobayashi | H01M 50/169 |
| 2020/0328425 | A1* | 10/2020 | Yamada | H01M 4/628 |

FOREIGN PATENT DOCUMENTS

| | | | | | |
|---|---|---|---|---|---|
| CN | 103298763 | B | | 3/2016 | |
| JP | 200225535 | A | | 1/2002 | |
| JP | 2006221909 | A | * | 8/2006 | H01M 50/166 |
| JP | 200827823 | A | | 2/2008 | |
| JP | 2012131896 | A | | 7/2012 | |
| JP | 2014510365 | A | | 4/2014 | |
| JP | 201644303 | A | | 4/2016 | |
| JP | 2016105374 | A | * | 6/2016 | |
| JP | 2017112117 | A | | 6/2017 | |
| JP | 201916594 | A | | 1/2019 | |
| JP | 202055205 | A | | 4/2020 | |
| WO | 2014174616 | A1 | | 10/2014 | |

* cited by examiner

LID BODY AND SEALED BATTERY

BACKGROUND OF THE INVENTION

1. Field of the Invention

The present disclosure relates to a lid body and to a sealed battery that utilizes the lid body. More specifically, the present disclosure relates to a lid body provided with a sealing material, and to a sealed battery that utilizes the same. The present application claims priority based on Japanese Patent Application No. 2020-198150 filed on Nov. 30, 2020, the entire contents whereof are incorporated in the present specification by reference.

2. Description of the Related Art

Nonaqueous electrolyte secondary batteries such as lithium ion secondary batteries have become increasingly important as vehicle-mounted power sources and power sources for personal computers and mobile terminals. In particular, lithium ion secondary batteries, which are lightweight and afford high energy densities, are preferably used as high-output power sources mounted on vehicles.

Secondary batteries of this type are constructed, for instance, in the form of a sealed battery in which an electrode body is accommodated in a battery case. A terminal is attached to a lid body of such a sealed battery, via a sealing material. As terminals utilized in sealed batteries, there are used, for instance, terminals that have an external terminal exposed outside the battery case and an internal terminal that is connected to the electrode body inside the battery case. Terminals having such a configuration are connected to the lid body by insertion of one of the external terminal and the internal terminal into a mounting hole of a sealing plate, and by crimping of the other one of the terminals.

The sealing material is required to exhibit sealability for keeping the interior of the battery case airtight. Moreover, the sealing material is required to possess mechanical strength that allows withstanding crimping strength at the time of attachment of the terminal to the sealing plate by crimping.

Japanese Patent Application Publication No. 2020-55205 discloses a technology that involves blending glass fibers into a resin member for the purpose of improving the strength and impact resistance of a resin member. Japanese Patent Application Publication No. 2016-44303 discloses a technology that involves blending a fibrous filler into a resin composition in order to improve the mechanical strength and dimensional stability of the resin composition that is used as the sealing material.

SUMMARY OF THE INVENTION

Attempts have been made in recent years to reduce the number of parts used in batteries, for the purpose of cutting manufacturing costs. For instance, an approach has been studied in which a terminal or sealing plate made of a metal is directly joined to a sealing material made up of a resin material, without using a component for joining the terminals by crimping. In the case of direct joining the sealing material and the terminal together, peeling at the joint surface therebetween may occur due to expansion or contraction of the component caused by changes in temperature.

When peeling occurs at the joint surface, the sealability of the sealing material drops, which translates into impaired battery performance.

The resins disclosed in Japanese Patent Application Publication No. 2020-55205 and Japanese Patent Application Publication No. 2016-44303 contain, for instance, glass fibers for the purpose of increasing mechanical strength. Even if the mechanical strength of the sealing material is improved, it is, however, difficult to prevent peeling at the joint surface of the sealing material and the terminal due to expansion or contraction of the component caused by changes in temperature.

There is thus a need for developing a technology that makes such peeling unlikely even during use in an environment with significant changes in temperature.

The present disclosure has been made in view of the above considerations, and an object thereof is to provide a lid body in which peeling does not readily occur at a joint surface between a metal member, such as a sealing plate or a terminal, and a sealing material made up of a resin material. Concurrently, another object of the present disclosure is to provide a high-durability sealed battery that utilizes such a lid body.

To attain the above objects, the lid body disclosed herein is a lid body used in a sealed battery provided with a case body having an opening and accommodating an electrode body, the lid body plugging the opening and including: a terminal member of at least one electrode from among a positive electrode and a negative electrode; a sealing plate having a mounting hole for attaching the terminal member; and a sealing material containing an inorganic filler. The terminal member is inserted into the mounting hole and is attached to the sealing plate in a state where the sealing material is joined to a peripheral edge portion of the mounting hole. In a microscope observation of a cross section of the sealing material, an average aspect ratio of the inorganic filler is 2 or higher, and with an orientation angle defined as an angle between a major axis direction of the inorganic filler and a surface of the sealing plate close to the inorganic filler, an average orientation angle of the inorganic filler is 30 degrees or smaller in at least the sealing material formed on an outer surface of the sealing plate.

A sealing material containing an inorganic filler is used in the lid body for a sealed battery disclosed herein. As described above, the inorganic filler is oriented so that the angle formed between the inorganic filler and the surface of the sealing plate is small. An orientation direction of the inorganic filler aligns with the direction of expansion or contraction of the sealing plate, as the sealing plate expands or contracts accompanying changes in the temperature of the usage environment of the sealed battery, and hence also the sealing material readily expands or contracts conforming to the sealing plate. That is, it becomes possible to reduce stress acting on the surface at which the metal member and the sealing material are joined, and to reduce friction acting on the surface at which the metal member and the sealing material are in contact. As a result, peeling at the surface at which the sealing material is joined to the metal member can be made unlikelier, and also the sealability of the sealing material can be suitably maintained. A sealed battery of favorable cold/heat resistance is provided by using a lid body having such a sealing material.

In one preferred aspect, the average aspect ratio of the inorganic filler in a microscope observation of the sealing material cross section is 10 or lower.

In such a configuration, the orientation of the inorganic filler can be readily aligned, also at the time of molding of the sealing material for instance by injection molding, and the above-described effect is brought out yet more suitably.

In one preferred aspect, the terminal member is mainly made up of a first metal; and the sealing plate is mainly made up of a second metal. With $\alpha_S$ as a coefficient of linear expansion at 25° C. of the sealing material in an orientation direction of the inorganic filler, $\alpha_1$ as a coefficient of linear expansion at 25° C. of the first metal and $\alpha_2$ as a coefficient of linear expansion at 25° C. of the second metal, $\alpha_L \leq \alpha_S \leq \alpha_H$ is satisfied, where $\alpha_H$ is the higher value and $\alpha_L$ is the lower value from among the $\alpha_1$ and $\alpha_2$.

In such a configuration, the coefficient of linear expansion of the sealing material in the orientation direction does not significantly deviate from those of the sealing plate and of the terminal member. As a result, the sealing material conforms yet more readily to the expansion or contraction of the various members, and sealability can be maintained yet more suitably.

In a preferred implementation of the technology disclosed herein, the first metal may be aluminum or an aluminum alloy, and the second metal may be copper or a copper alloy.

In a case for instance where the first metal is aluminum and the second metal is copper, the coefficient of linear expansion at 25° C. of the sealing material is preferably set to lie in the range from $1.6\times10^{-5}$/K to $2.3\times10^{-5}$/K.

In a preferred implementation of the technology disclosed herein, at least part of the sealing material is joined to the negative electrode terminal by an anchor effect.

In a sealed battery having such a configuration, stress acting on a joint surface of the sealing material and the negative electrode terminal member is reduced. Peeling at the joint surface is rendered unlikelier as a result.

In another aspect of the technology disclosed herein, there is provided a sealed battery having an electrode body having a positive electrode and a negative electrode, a case body having an opening, and which accommodates the electrode body, and the lid body disclosed herein, the lid body plugging the opening.

DESCRIPTION OF THE PREFERRED EMBODIMENTS

Figure 1:
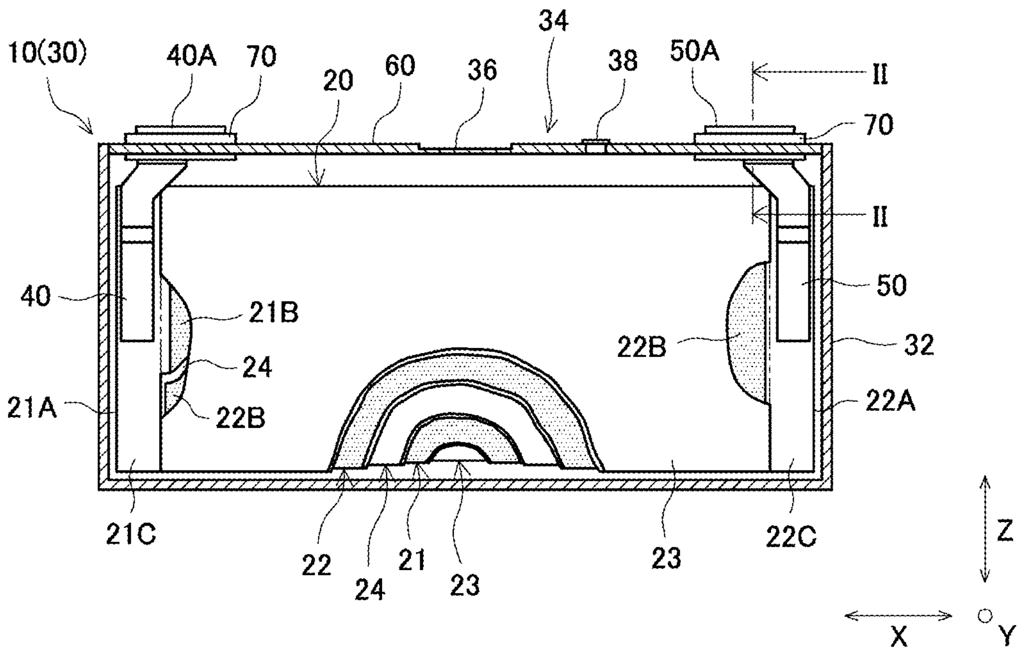
FIG. 1 is a cross-sectional diagram illustrating schematically the internal structure of a sealed battery according to an embodiment.

The lid body and the sealed battery disclosed herein will be explained in detail, with reference to accompanying drawings, on the basis of an example of a lithium ion secondary battery provided with a wound electrode body. Needless to say, the embodiments described below are not meant to particularly restrict the technology disclosed herein.

Any features other than the matter specifically set forth in the present specification and that may be necessary for carrying out the present disclosure can be regarded as design matter for a person skilled in the art based on conventional art in the relevant field. The present disclosure can be realized on the basis of the disclosure of the present specification and common technical knowledge in the relevant field.

In the drawings that accompany the explanation below, members and portions that elicit identical effects are explained while denoted by identical reference numerals, and a recurrent explanation thereof will be omitted or simplified. Dimensional relationships such as length and width in the drawings below do not necessarily reflect actual dimensional relationship.

In the present specification, a numerical value range notated as "A to B" (where A and B are arbitrary numerical values) denotes a value equal to or larger than A and equal to or smaller than B. In the present specification, the language "mainly" denotes a component that takes up the largest weight from among arbitrary constituent components.

Figure 2:
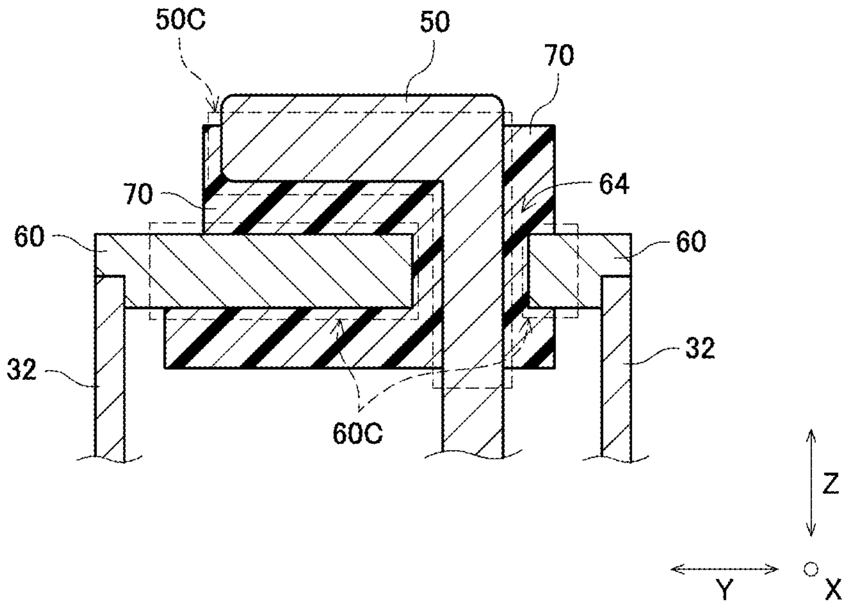
FIG. 2 is an II-II line cross-sectional diagram in FIG. 1, and is a partial cross-sectional diagram illustrating schematically the structure of a lid body according to an embodiment.

FIG. 1 is a cross-sectional diagram illustrating schematically the internal structure of a sealed battery 10 according to the present embodiment. FIG. 2 is a partial cross-sectional diagram illustrating schematically the structure of a lid body 34. The reference symbol X in the figures of the present specification denotes a width direction, the reference symbol Y denotes a thickness direction and the reference symbol Z denotes a height direction. These directions are defined however for convenience of explanation, and are not intended to limit the mode in which the battery is installed.

As illustrated in FIG. 1, the sealed battery 10 according to the present embodiment includes an electrode body 20 and a battery case 30. The electrode body 20 disclosed herein is a power generation element accommodated inside a battery case 30 in a state where the electrode body 20 is covered with for instance an insulating film not shown. The electrode body 20 is a so-called wound electrode body resulting from laying an elongated sheet-shaped positive electrode 21 and an elongated sheet-shaped negative electrode 22 on each other, with two similarly elongated sheet-shaped separators 23, 24 interposed in between, and winding the resulting stack to a flat shape. The electrode body 20 is accommodated in a battery case body 32 together with a nonaqueous electrolyte solution (not shown), and a peripheral edge portion of the lid body 34 is hermetically closed and sealed, for instance by welding, with the interior of the battery case body 32 in a depressurized state.

The positive electrode 21 includes a foil-shaped positive electrode collector 21A, and a positive electrode active material layer 21B formed, in the longitudinal direction, on one face or both faces of the positive electrode collector 21A. At one side edge portion of the electrode body 20 in the width direction X there is provided a positive electrode collector exposed portion 21C in which the positive electrode active material layer 21B is not formed and at which the positive electrode collector 21A is exposed. The positive electrode active material layer 21B contains various materials such as a positive electrode active material, a binder and a conductive material. Materials that can be used in conventional lithium ion secondary batteries in general may be utilized, without particular limitations, as the materials contained in the positive electrode active material layer 21B. These materials are not a characterizing feature of the present disclosure and accordingly a detailed explanation thereof will be omitted.

The negative electrode 22 is provided with a foil-shaped negative electrode collector 22A, and a negative electrode active material layer 22B formed on one face or both faces of the negative electrode collector 22A in the longitudinal direction. On the other side edge portion of the electrode body 20 in the width direction X there is provided a negative electrode collector exposed portion 22C on which the negative electrode active material layer 22B is not formed and at which the negative electrode collector 22A is exposed. Similarly to the positive electrode active material layer 21B, the negative electrode active material layer 22B contains various materials such as a negative electrode active material and a binder. Materials that can be used in conventional lithium ion secondary batteries in general can be used, without particular limitations, as the materials contained in the negative electrode active material layer 22B. These materials are not a characterizing feature of the present disclosure and accordingly a detailed explanation thereof will be omitted.

The separators 23, 24 are interposed between the positive electrode 21 and the negative electrode 22, to prevent direct contact between the electrodes. Although not depicted in the figure, multiple small holes are formed in the separators 23, 24. The small holes are configured so that charge carriers (lithium ions in the case of a lithium ion secondary battery) move between the positive electrode 21 and the negative electrode 22.

For instance, resin sheets of required heat resistance, polyolefin-made sheets of polypropylene, polystyrene or the like, are used as the separators 23, 24.

As the nonaqueous electrolyte solution accommodated in the in the battery case 30 there can be used, without particular limitations, a nonaqueous electrolyte solution utilized in conventional lithium ion secondary batteries in general, the nonaqueous electrolyte solution typically containing a nonaqueous solvent and a supporting salt; the nonaqueous electrolyte solution is herein not a characterizing feature of the present disclosure, and accordingly a detailed explanation thereof will be omitted.

The battery case 30 is a container that accommodates the electrode body 20. The battery case 30 in the present embodiment is a flat square container that includes a square case body 32 having an open top face, and a plate-like lid body 34 that plugs the opening of the case body 32. The lid body 34 is provided with a thin-walled safety valve 36 that is set to release the internal pressure within the battery case 30 in a case where that internal pressure rises to or above a predetermined level. The lid body 34 is provided with a filling port 38 for injecting a nonaqueous electrolyte solution. A metallic material of required strength is used in the case body 32 and the lid body 34; for instance, aluminum or an aluminum alloy can be used herein.

The lid body 34 includes a sealing plate 60, a positive electrode terminal member 40, a negative electrode terminal member 50, and a sealing material 70. The sealing plate 60 is an aluminum-made plate of rectangular shape, and has a mounting hole 64 into which the positive electrode terminal member 40 and the negative electrode terminal member 50 are inserted.

The negative electrode terminal member 50 is an elongated metal member extending along the height direction Z. As illustrated in FIG. 1, the lower end portion of the negative electrode terminal member 50 is connected to the negative electrode collector exposed portion 22C. As illustrated in FIG. 2, the negative electrode terminal member 50 passes through the mounting hole 64 and is exposed outside the battery case 30. A portion of the negative electrode terminal member 50 exposed outside the battery case 30 is bent at right angles in such a manner that an upper end portion 50A is parallel to the sealing plate 60. The negative electrode terminal member 50 is attached at the mounting hole 64 in a state where the sealing material 70 is joined to the negative electrode terminal member 50.

The positive electrode terminal member 40 is an elongated metal member extending along the height direction Z. As illustrated in FIG. 1, the lower end portion of the positive electrode terminal member 40 is connected to the positive electrode collector exposed portion 21C. The positive electrode terminal member 40 passes through the mounting hole 64 and is exposed outside the battery case 30. The portion of the positive electrode terminal member 40 exposed outside the battery case 30 is bent at right angles so that an upper end portion 40A is parallel to the sealing plate 60. The positive electrode terminal member 40 is attached at the mounting hole 64 in a state where the sealing material 70 is joined to the positive electrode terminal member 40.

The configuration of the lid body 34 disclosed in herein will be explained hereafter, with reference to FIG. 2, on the basis of the configuration on the negative electrode terminal side. FIG. 2, which is an II-II line cross-sectional diagram in FIG. 1, is a partial cross-sectional diagram illustrating schematically the structure of a cross section, of the lid body 34 disclosed herein, including the negative electrode terminal member 50. The configuration on the positive electrode terminal side can be set to be identical to the configuration on the negative electrode terminal side explained below, and thus a detailed explanation of the former will be omitted.

The sealing material 70 is disposed between the negative electrode terminal member 50 and the sealing plate 60, so as to plug the mounting hole 64, in order to insulate the negative electrode terminal member 50 and the sealing plate 60 from each other and to maintain the airtightness of the interior of the sealed battery 10.

The sealing material 70 is substantially made up of a thermoplastic resin and an inorganic filler. A conventional thermoplastic resin in general can be used as the thermoplastic resin. Although not limited thereto, for instance a polyarylene sulfide (PAS) or the like is used herein, preferably polyphenylene sulfide (PPS). The material used as the inorganic filler is not particularly limited, so long as the effect of the present disclosure is elicited. Although not limited thereto, glass fibers, alumina, potassium titanate or the like can be used herein as the inorganic filler.

Figure 3:
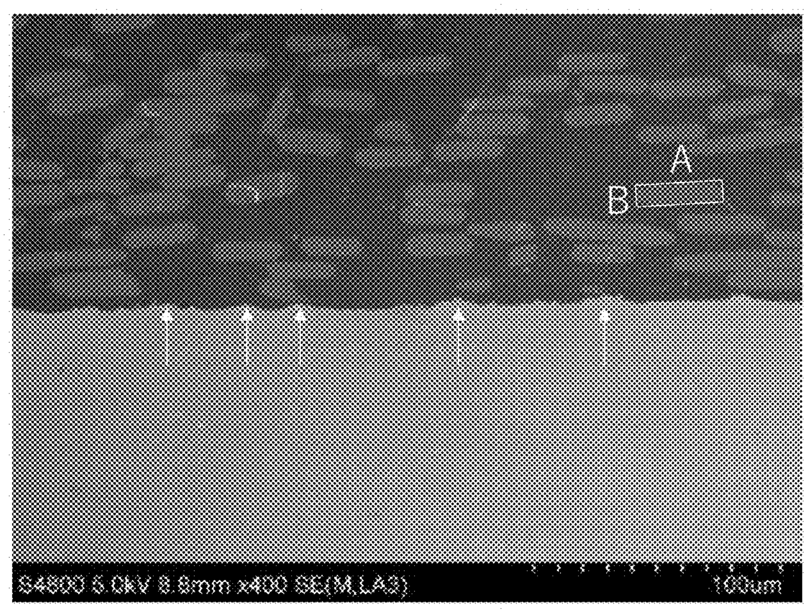
FIG. 3 is a cross-sectional SEM image of a sealing material according to an embodiment.

FIG. 3 is a cross-sectional SEM image of the sealing material 70, including the interface with the sealing plate 60. In the present embodiment, an inorganic filler having an average aspect ratio of 2 or higher, as illustrated in FIG. 3, is used as the inorganic filler. To mold the sealing material 70 by injection molding as described below it is preferable to orient an inorganic filler having such an aspect ratio along the surface of the sealing plate 60 and the negative electrode terminal member 50. That is, the major axis direction of the inorganic filler is preferably oriented along the surface of the sealing plate 60 and the negative electrode terminal member 50 close to the inorganic filler. The average aspect ratio of the inorganic filler is not particularly limited, so long as the effect of the present disclosure is elicited. The average aspect ratio of the inorganic filler is preferably 2 or higher, more preferably 3 or higher, and may be for instance 5 or higher. The upper limit of the average aspect ratio of the inorganic filler is not particularly restricted, so long as the effect of the present disclosure is elicited. From the viewpoint of ease of orientation as a result of the below-described injection molding, however, the average aspect ratio is ordinarily 20 or lower, preferably 10 or lower, and may be for instance 8 or lower.

The inorganic filler is not particularly limited so long as the average aspect ratio thereof is 2 or higher. For instance, an inorganic filler of fibrous, scaly, elliptical shape or the like can be preferably used as the inorganic filler. The thermoplastic resin and inorganic filler used in the sealing material 70 are not limited to one respective type, but may each include a plurality of types. The sealing material 70 may contain materials other than the thermoplastic resin and the inorganic filler, so long as the effect of the present disclosure is not impaired.

Defining in the present embodiment an orientation angle as the angle between the major axis direction of the inorganic filler and the surface of the sealing plate 60 close to the inorganic filler, as illustrated in FIG. 3, an average orientation angle of the inorganic filler is 30° or smaller, at least in the sealing material 70 formed on the outer surface of the sealing plate 60. The sealing material 70 readily conforms thus to member expansion or contraction by virtue of the fact that the average orientation angle formed by the inorganic filler included in the sealing material 70 and the member surface close to the inorganic filler is small. That is, it becomes possible to reduce stress acting on the surface at which the metal member and the sealing material are joined, and to reduce friction acting on the surface at which the metal member and the sealing material are in contact. From this point of view, the inorganic filler preferably exhibits a small average orientation angle with respect to not only the outer surface of the sealing plate 60, but also to the inner surface of the sealing plate 60, the side wall of the mounting hole 64, and the negative electrode terminal member 50. The average orientation angle of the inorganic filler is preferably 30° or smaller, but is more preferably 20° or smaller, yet more preferably 15° or smaller, and even yet more preferably for instance 5° or smaller.

In the present specification, the term "aspect ratio" of the inorganic filler denotes the ratio of the dimension of the inorganic filler in the major axis direction relative to the dimension in the minor axis direction. To work out the aspect ratio of the inorganic filler, a smallest rectangle circumscribing an inorganic filler particle is drawn in a cross-sectional SEM image of the sealing material 70, as illustrated in FIG. 3, and a ratio (A/B) of the long side A of such a rectangle relative to the short side B is calculated as the aspect ratio. An arithmetic mean value of the aspect ratio of the inorganic filler included in a 304 μm×150 m region of a sealing material cross section can be taken herein as the "average aspect ratio" of the inorganic filler. The average aspect ratio is calculated by excluding inorganic filler having a small cross-sectional area, for instance having a cross-sectional area of 100 $\mu m^2$ or less on the SEM image.

In the present specification the "orientation angle" of the inorganic filler is measured on the basis of the following procedure. Firstly there is acquired a cross-sectional SEM image of the sealing material 70 in such a manner that the surface of the metal member (sealing plate 60 or terminal member) is included in the SEM image. In the above cross-sectional SEM image, there are selected arbitrarily, for instance, five protrusions formed on the surface of the metal member (sealing plate 60 in the figure), such as those denoted by the arrows in FIG. 3. An average line of the selected five points is drawn, to be used as a reference line. The orientation angle is defined then as the angle (acute angle) formed by that reference line and the long side A of the inorganic filler. An arithmetic mean value of the orientation angle of the inorganic filler included in a 304 μm×150 μm region of the sealing material cross section can be taken herein as the "average orientation angle" of the inorganic filler. The average orientation angle is calculated, for instance, by excluding inorganic filler having a small cross-sectional area, for instance inorganic filler having a cross-sectional area of 100 $\mu m^2$ or less on the SEM image.

In the present embodiment, the sealing material 70 is joined by virtue of an anchor effect to the surface of contact (contact surface 50C) with the negative electrode terminal member 50. The sealing material 70 is also joined, by virtue of an anchor effect, to the surface of contact (contact surface 60C) with the sealing plate 60.

Specifically, the contact surface 50C on the negative electrode terminal member 50 and the contact surface 60C on the sealing plate 60 are subjected to a surface roughening treatment, to form fine irregularities thereon. The sealing material 70 gets into these fine irregularities and becomes joined as a result to the negative electrode terminal member 50 and the sealing plate 60. The surface roughening treatment can be accomplished in accordance with known physical and/or chemical methods. Examples of surface treatment methods include laser processing, sandblasting and anodization.

The sealing material 70 can be molded, by injection molding, in a state of being integrally joined to the sealing plate 60 and the negative electrode terminal member 50 by an anchor effect. The inorganic filler can become oriented relative to the sealing plate 60 and the negative electrode terminal member 50 through setting of the conditions of the injection mold.

The sealing material 70 can be molded, for instance, in accordance with the method below.

The thermoplastic resin and the inorganic filler used in the sealing material 70 are melted, to prepare a resin for injection molding. A mold is prepared such that the sealing plate 60 and the negative electrode terminal member 50 can be disposed therein, and so as to match the shape of the sealing material 70. The sealing plate 60 and the negative electrode terminal member 50 are placed in the mold. Then molten resin for injection molding is poured into the mold, under predetermined conditions. The conditions for injection molding are adjusted as appropriate for instance depending on the material of the sealing material 70, the dimensions of the members and the shape of the inorganic filler. For instance, injection molding can be carried out at a resin temperature of about 250 to 350° C., at an injection rate of about 10 to 60 mm/s, and at a holding pressure of about 20 to 100 MPa.

In the present embodiment the sealing plate 60 is made of aluminum and the negative electrode terminal member 50 is made of copper. The coefficient of linear expansion of the sealing material 70 is preferably adjusted to be close to the values of coefficient of linear expansion of the sealing plate 60 and of the negative electrode terminal member 50, from the viewpoint of allowing the sealing material 70 to suitably conform to the sealing plate 60 and the negative electrode terminal member 50 upon expansion or contraction accompanying changes in temperature. Specifically, the coefficient of linear expansion of the sealing material 70 is preferably adjusted so as to range from $1.6\times10^{-5}$/K, as the coefficient of linear expansion of copper, to $2.3\times10^{-5}$/K, as the coefficient of linear expansion of aluminum. As described above, the sealing material 70 is made up of a thermoplastic resin and an inorganic filler. The coefficient of linear expansion of the sealing material 70 can be adjusted for instance by modifying the type and content of the inorganic filler that is used. For instance, the coefficient of linear expansion can be lowered by increasing the content of the inorganic filler that is used in the sealing material 70.

The coefficient of linear expansion in the present specification is the coefficient of linear expansion at 25° C. The coefficient of linear expansion can be measured by thermomechanical analysis (TMA).

Preferably, the coefficient of linear expansion of the sealing material 70 is adjusted to lie within a range from the coefficient of linear expansion of sealing plate 60 to the coefficient of linear expansion of negative electrode terminal member 50 that are to be joined. As a result, even if the sealing plate 60 and the negative electrode terminal member 50 expand or contract due to changes in temperature, the sealing material 70 conforms to that the expansion or contraction. It becomes therefore possible to prevent peeling from occurring at the surface at which the sealing material 70 and the sealing plate 60 are joined and on the surface at which the sealing material 70 and the negative electrode terminal member 50 are joined.

In the above embodiment the terminal member is in the form of one member, i.e. is made up of the negative electrode terminal member 50, but the terminal member is not limited to such an embodiment. The terminal member may be made up of a plurality of members. For instance, the terminal member may be made up of an external terminal and an internal terminal of dissimilar metals types, for the purpose of improving conduction between external connection parts such as bus bars and the terminals. In this case, the terminal member and the sealing material 70 can be joined through crimping of one from among the external terminal and the internal terminal onto the other, across the sealing material 70 in between.

In such a case as well, the average orientation angle of the inorganic filler included in the sealing material takes on the above-described value relative to the member in contact with the sealing material, so that it becomes as a result possible to reduce the load derived for instance from friction acting on the contact surface. An effect can be elicited thereby of suppressing deformation or damage to the sealing material, while maintaining sealability.

In the embodiment described above the contact surface 50C of the negative electrode terminal member 50 and the entirety of the contact surface 60C of the sealing plate 60 are joined by virtue of an anchor effect, but the joining range is not limited thereto. The sealing material 70 may be partially joined to the contact surfaces 50C, 60C, so long as joining strength and sealability are sufficient.

The sealed battery disclosed herein is not limited to the lithium ion secondary battery explained above, and for instance also sodium ion secondary batteries, magnesium ion secondary batteries, or lithium ion capacitors or the like encompassed in so-called physical batteries fall under the term sealed battery. The explanation herein is based on a lithium ion secondary battery that is provided with a wound electrode body having a structure in which multiple electrode bodies of a positive electrode and a negative electrode are wound across interposed separators. However, the electrode body is not limited to such a configuration, and may be a so-called multilayer electrode body in which multiple electrode bodies of a positive electrode and a negative electrode are stacked across interposed separators.

Preferred embodiments will be described below with reference to examples, but the present disclosure is not meant to be limited to such examples.

Test samples simulating the lid body of a sealed battery were produced, and the influence of the average orientation angle and average aspect ratio of the inorganic filler on cold/heat resistance was evaluated. Specifically, a thermal cycling test and a helium leak test were performed on test samples in which the average orientation angle of the inorganic filler with respect to the metal member and the average aspect ratio of the inorganic filler had been set to various conditions.

Preparation of Test Samples

Example 1 to Example 5

Herein PPS (polyphenylene sulfide) and glass fibers having an average aspect ratio of 2 were prepared to a ratio by weight of the foregoing of PPS:glass fibers=80:20. Then PPS was melted at 330° C., and was mixed with an inorganic filler, to prepare an injection molding material.

There were prepared a 50 mm×50 mm×3 mm test pieces made of aluminum, and having a φ8 mm through-hole in the center. One of the surfaces of each test piece was subjected to a surface roughening treatment by laser irradiation.

A mold was prepared, for the surface of the test piece having undergone the surface roughening treatment, such that the through-hole of the test piece was plugged and such that a φ16 mm×3 mm injection molded body could be molded at the center of the test piece. The test piece was then placed in the mold.

A test molding material at 330° C. was filled in while modifying in various ways the injection rate in the mold.

Once the test molding material had cooled and hardened, the mold was removed, to yield Test sample examples 1 to 5 in which a φ16 mm×3 mm molded body was molded in the test piece. The molded body is molded on one face of the test sample, whereas no molded body is molded on the other face. Hereinafter, the surface on which the molded body is molded will be referred to as a molded surface, and the surface on which no molded body is molded will be referred to as a non-molded surface.

Example 6

Test sample example 6 was produced in the same way as in Example 4 but using herein glass fibers having an average aspect ratio of 1.6 as the glass fibers mixed with PPS.

Measurement of the Average Orientation Angle

The produced Test sample examples 1 to 6 were subjected to cross-sectional SEM observation, and the respective average orientation angles were measured in accordance with the above-described method. The results are given in Table 1.

TABLE 1

| Test sample | Average orientation angle | Average aspect ratio | Thermal cycling resistance |
|---|---|---|---|
| Example 1 | 5° | 2 | Good |
| Example 2 | 15° | 2 | Good |
| Example 3 | 20° | 2 | Good |
| Example 4 | 30° | 2 | Good |
| Example 5 | 40° | 2 | Poor |
| Example 6 | 30° | 1.6 | Poor |

Thermal Cycling Test

Thermal cycling from −65° C. to 120° C. was carried out, over 5500 cycles, for Test sample examples 1 to 6.

Helium Leak Test 1

Test sample examples 1 to 6 after the thermal cycling test were then subjected to helium leak test using a helium detector, in order to evaluate the sealability between the test piece and the injection molded body. Helium was introduced from the non-molded surface side and suction was applied from the molded surface side, so that the resulting differential pressure was 2 atmospheres, and the leakage amount of helium from the molded surface side was detected. A helium leakage amount of $1.0\times10^{-5}$ ($Pa\cdot m^3/s$) or larger, as detected by the helium detector, was rated as poor, and a leakage amount smaller than that was rated as good. The results are given in Table 1.

Helium Leak Test 2

A test that involved modifying the number of cycles in the thermal cycling test was performed for Test sample examples 2, 5 and 6, and there was evaluated the number of cycles that allowed maintaining sealability between the test piece and the injection molded body.

Figure 4:
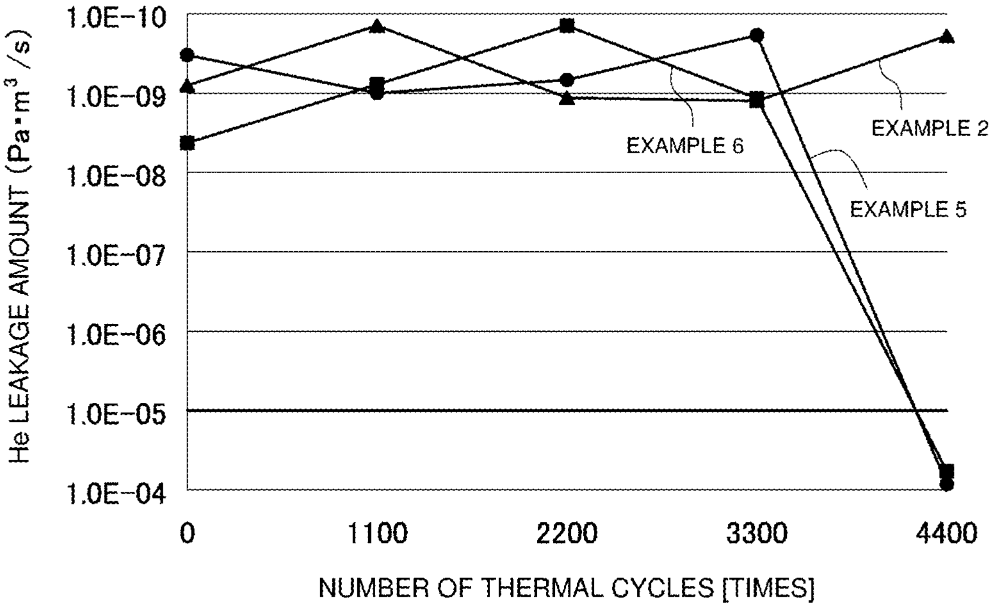
FIG. 4 is a graph illustrating a relationship between a number of thermal cycles and a helium leakage amount in various examples.

Thermal cycling from −40° C. to 120° C. was performed over 1100 cycles, 2200 cycles, 3300 cycles and 4400 cycles. A helium leak test was performed thereafter, under the conditions described above, for test samples after thermal cycling, over the respective number of cycles, and also for test samples not having undergone thermal cycling; the respective helium leakage amounts were detected. The results are illustrated in FIG. 4.

As Table 1 reveals, sealability between the test piece and the injection molded body was good, also after the thermal cycling test, in Test sample examples 1 to 4 in which the average aspect ratio was 2 and the average orientation angle of the inorganic filler included in the molded body was 30° or smaller. In Example 5, where the average orientation angle of the inorganic filler contained in the molded body was 40° and Example 6, in which the average aspect ratio was 1.6, sealability between the test piece and the injection molded body after the thermal cycling test was not good. Moreover, the results in FIG. 4 indicate peeling at the interface between the test piece and the molded body, before the number of thermal cycles had reached 4400, in Example 5 and Example 6.

It is deemed that in a case where the inorganic filler contained in the molded body was oriented towards the contact surface with the test piece, the molded body suitably conformed to the expansion or contraction of the test piece as the test sample expanded or contracted, so that stress acting on the interface decreases. It is also found that in a case where orientation was insufficient (average orientation angle larger than 30°) or in a case where the average aspect ratio was low (average aspect ratio lower than 2), peeling occurred at the interface as a result of repeated expansion or contraction of the test piece, with the molded body failing to conform to the test piece.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A lid body used in a sealed battery provided with a case body having an opening and accommodating an electrode body, the lid body plugging the opening and comprising:
- a sealing plate having a mounting hole;
- a terminal member of at least one electrode from among a positive electrode and a negative electrode, the terminal member being inserted into the mounting hole and attached to the sealing plate; and
- a sealing material containing an inorganic filler and a thermoplastic resin, disposed between the terminal member and the sealing plate, and joined to an inner peripheral surface of the mounting hole, wherein the inorganic filler contains potassium titanate, the thermoplastic resin contains polyarylene sulfide, in a microscope observation of a cross section of the sealing material,
- an average aspect ratio of the inorganic filler is 2 or higher, and
- with an orientation angle defined as an angle between a major axis direction of the inorganic filler and a surface of the sealing plate close to the inorganic filler, an average of the orientation angle of the inorganic filler is 30 degrees or smaller in at least the sealing material formed on an outer surface of the sealing plate, the sealing material is joined to the inner peripheral surface of the mounting hole, the outer surface of the sealing plate, an inner surface of the sealing plate, and the terminal member by an anchor effect, the terminal member includes
- a first portion extending from the mounting hole in a first direction, and
- a second portion extending continuously from the first portion in a second direction perpendicular to the first direction, the second portion including
  - a first end surface facing the second direction, and
  - a second end surface facing the second direction and opposite to the first end surface with respect to the first portion, the sealing material is directly joined to the first end surface of the second portion and the second end surface of the second portion, the second portion extends parallel to the outer surface of the sealing plate, and the terminal member consists of a single plate-shaped member that has been bent perpendicularly to form the first portion and the second portion continuous to each other.

2. The lid body according to claim 1, wherein the average aspect ratio of the inorganic filler in the microscope observation of the cross section of the sealing material is 10 or lower.

3. The lid body according to claim 1, wherein the terminal member is mainly made up of a first metal, the sealing plate is mainly made up of a second metal, and with $\alpha_S$ as a coefficient of linear expansion at 25° C. of the sealing material in an orientation direction of the inorganic filler, $\alpha_1$ as a coefficient of linear expansion at 25° C. of the first metal and $\alpha_2$ as a coefficient of linear expansion at 25° C. of the second metal, $\alpha_1 \le \alpha_S \le \alpha_H$ is satisfied, where $\alpha_H$ is a higher value and $\alpha_L$ is a lower value from among the $\alpha_1$ and $\alpha_2$.

4. The lid body according to claim 3, wherein the first metal is copper and the second metal is aluminum.

5. The lid body according to claim 3, wherein the coefficient of linear expansion at 25° C. of the sealing material is from $1.6\times10^{-5}$/K to $2.3\times10^{-5}$/K.

6. The lid body according to claim 1, wherein the average of the orientation angle of the inorganic filler is 30 degrees or smaller relative to the inner peripheral surface of the mounting hole of the sealing plate and a surface at which the terminal member and the sealing material are in contact.

7. The lid body according to claim 1, wherein the terminal member is mainly made of copper, and the sealing plate is mainly made of aluminum.

8. The lid body according to claim 1, wherein the sealing material consists of a single body that covers both the outer surface and the inner surface of the sealing plate.

9. The lid body according to claim 1, wherein the sealing material includes an outer part extending continuously on the outer surface of the sealing plate from the first end surface to the second end surface, and an inner part extending continuously from the outer part to the inner surface of the sealing plate, wherein the inner part extends beyond the first end surface in the second direction.

10. A sealed battery, comprising:

an electrode body having a positive electrode and a negative electrode;

a case body having an opening and accommodating the electrode body; and a lid body plugging the opening, wherein the lid body plugging comprises a sealing plate having a mounting hole, a terminal member of at least one electrode from among the positive electrode and the negative electrode, the terminal member being inserted into the mounting hole and attached to the sealing plate, and a sealing material containing an inorganic filler and a thermoplastic resin, disposed between the terminal member and the sealing plate, and joined to an inner peripheral surface of the mounting hole, the inorganic filler contains potassium titanate, the thermoplastic resin contains polyarylene sulfide, in a microscope observation of a cross section of the sealing material, an average aspect ratio of the inorganic filler is 2 or higher, and with an orientation angle defined as an angle between a major axis direction of the inorganic filler and a surface of the sealing plate close to the inorganic filler, an average of the orientation angle of the inorganic filler is 30 degrees or smaller in at least the sealing material formed on an outer surface of the sealing plate, the sealing material is joined to the inner peripheral surface of the mounting hole, the outer surface of the sealing plate, an inner surface of the sealing plate, and the terminal member by an anchor effect, the terminal member includes a first portion extending from the mounting hole in a first direction, and a second portion extending continuously from the first portion in a second direction perpendicular to the first direction, the second portion including a first end surface facing the second direction, and a second end surface facing the second direction and opposite to the first end surface with respect to the first portion, the sealing material is directly joined to the first end surface of the second portion and the second end surface of the second portion, the second portion extends parallel to the outer surface of the sealing plate, and the terminal member consists of a single plate-shaped member that has been bent perpendicularly to form the first portion and the second portion continuous to each other.

11. The sealed battery according to claim 10, wherein the average of the orientation angle of the inorganic filler is 30 degrees or smaller relative to the inner peripheral surface of the mounting hole of the sealing plate and a surface at which the terminal member and the sealing material are in contact.

12. The sealed battery according to claim 10, wherein the terminal member is mainly made of copper, and the sealing plate is mainly made of aluminum.

13. The sealed battery according to claim 10, wherein the sealing material consists of a single body that covers both the outer surface and the inner surface of the sealing plate.

14. The sealed battery according to claim 10, wherein the sealing material includes an outer part extending continuously on the outer surface of the sealing plate from the first end surface to the second end surface, and an inner part extending continuously from the outer part to the inner surface of the sealing plate, wherein the inner part extends beyond the first end surface in the second direction.

* * * * *